(12) United States Patent
Zhou et al.

(10) Patent No.: US 10,488,739 B2
(45) Date of Patent: Nov. 26, 2019

(54) MOTOR, GIMBAL HAVING THE MOTOR, AND IMAGE CAPTURING DEVICE HAVING THE GIMBAL

(71) Applicant: SZ DJI OSMO TECHNOLOGY CO., LTD., Shenzhen (CN)

(72) Inventors: Li Zhou, Shenzhen (CN); Peng Wang, Shenzhen (CN)

(73) Assignee: SZ DJI OSOM TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/115,422

(22) PCT Filed: Jul. 3, 2014

(86) PCT No.: PCT/CN2014/081613
§ 371 (c)(1),
(2) Date: Jul. 29, 2016

(87) PCT Pub. No.: WO2015/127741
PCT Pub. Date: Sep. 3, 2015

(65) Prior Publication Data
US 2017/0176840 A1     Jun. 22, 2017

(30) Foreign Application Priority Data
Feb. 28, 2014 (CN) .......................... 2014 1 0070502

(51) Int. Cl.
    *G03B 17/56*     (2006.01)
    *F16M 11/06*     (2006.01)
    (Continued)

(52) U.S. Cl.
    CPC .......... *G03B 17/561* (2013.01); *F16M 11/06* (2013.01); *F16M 11/18* (2013.01); *H02K 1/27* (2013.01);
    (Continued)

(58) Field of Classification Search
    CPC ...... G03B 17/561; H02K 11/215; H02K 1/27; F16M 11/06; F16M 11/18; H04N 5/23287
    (Continued)

(56) References Cited

U.S. PATENT DOCUMENTS

| | | | |
|---|---|---|---|
| 2002/0093257 A1* | 7/2002 | Horng | H02K 29/08 310/68 B |
| 2003/0059212 A1* | 3/2003 | Desbiolles | H02P 6/16 388/804 |

(Continued)

FOREIGN PATENT DOCUMENTS

| | | |
|---|---|---|
| CN | 200987089 Y | 12/2007 |
| CN | 201185382 Y | 1/2009 |

(Continued)

OTHER PUBLICATIONS

English-language extended Search Report from the European Patent Office in counterpart European Application No. EP 14 88 3771 dated Jan. 16, 2017.

(Continued)

*Primary Examiner* — Clayton E. LaBalle
*Assistant Examiner* — Dennis Hancock
(74) *Attorney, Agent, or Firm* — Anova Law Group, PLLC

(57) ABSTRACT

The present invention discloses a motor comprising a stator, a rotator rotatably connected with the stator and an electrical connector that provides an electric signal to the motor. The motor further comprises a magnet fixed on the rotator and a Hall angular displacement sensor fixed on the electrical connector and arranged opposite to the magnet. The magnet and the Hall angular displacement sensor are spaced from each other by the electrical connector. The present invention further discloses a gimbal using the motor and an image capturing device using the gimbal.

10 Claims, 4 Drawing Sheets

(51) Int. Cl.
 *F16M 11/18* (2006.01)
 *H02K 11/215* (2016.01)
 *H02K 1/27* (2006.01)
 *H04N 5/232* (2006.01)

(52) U.S. Cl.
 CPC ....... *H02K 11/215* (2016.01); *H04N 5/23287* (2013.01)

(58) Field of Classification Search
 USPC .......................................................... 396/428
 See application file for complete search history.

(56) References Cited

U.S. PATENT DOCUMENTS

| | | | |
|---|---|---|---|
| 2006/0232148 | A1 | 10/2006 | Chen |
| 2007/0183907 | A1* | 8/2007 | Serowy ................ H02K 5/1735 417/354 |
| 2010/0019120 | A1* | 1/2010 | Burnham ............. F16M 11/123 248/550 |
| 2010/0196174 | A1 | 8/2010 | Lee |
| 2010/0231069 | A1* | 9/2010 | Liao ..................... H02K 7/1025 310/77 |
| 2010/0244637 | A1 | 9/2010 | Yoshikawa et al. |
| 2012/0104903 | A1 | 5/2012 | Tang |
| 2012/0176073 | A1 | 7/2012 | Amagasa |
| 2012/0229005 | A1* | 9/2012 | Tominaga ............ B62D 5/0406 310/68 B |
| 2013/0099609 | A1 | 4/2013 | Ikeno et al. |
| 2013/0342086 | A1 | 12/2013 | Jang |
| 2014/0105768 | A1 | 4/2014 | Franz et al. |
| 2014/0145564 | A1* | 5/2014 | Taniguchi .......... H02K 11/0021 310/68 B |
| 2015/0077033 | A1* | 3/2015 | Lee ...................... H02K 37/00 318/696 |
| 2015/0333600 | A1* | 11/2015 | Nakano ............. H02K 11/0021 310/71 |

FOREIGN PATENT DOCUMENTS

| | | |
|---|---|---|
| CN | 201315525 Y | 9/2009 |
| CN | 101802415 A | 8/2010 |
| CN | 201830125 U | 5/2011 |
| CN | 102545524 A | 7/2012 |
| CN | 102594028 A | 7/2012 |
| CN | 202647109 U | 1/2013 |
| CN | 102947609 A | 2/2013 |
| CN | 103066787 A | 4/2013 |
| CN | 103516141 A | 1/2014 |
| CN | 103547133 A | 1/2014 |
| CN | 103825408 A | 5/2014 |
| CN | 203722420 U | 7/2014 |
| EP | 3 086 451 A1 | 10/2016 |
| JP | 2012-147519 | 8/2002 |
| JP | 2003-189546 | 7/2003 |
| JP | 2009-153309 | 7/2009 |
| JP | 2010-39350 | 2/2010 |
| JP | 2010-136588 A | 6/2010 |
| JP | 2013-11538 | 1/2013 |
| WO | WO 2006/065892 A2 | 6/2006 |

OTHER PUBLICATIONS

An Office Action issued by the State Intellectual Property Office of the People's Republic of China ("SIPO Office Action") dated Sep. 5, 2016 regarding Chinese patent application No. 201410070502.1.
An Office Action issued by the State Intellectual Property Office of the People's Republic of China ("SIPO Office Action") dated Feb. 3, 2016 regarding Chinese patent application No. 201410070502.1.
An International Search Report and Written Opinion of PCT application PCT/CN2014/081613 dated Sep. 3, 2015.
Ji Xuewu et al., Permanent Magnet Synchronous Motor with Magnetic Rotary Encoder Application of Position Measurement Electric Drive. Feb. 29, 2008, p. 6-8. vol. 38. Beijing, CN.

* cited by examiner

MOTOR, GIMBAL HAVING THE MOTOR, AND IMAGE CAPTURING DEVICE HAVING THE GIMBAL

CROSS-REFERENCE TO RELATED APPLICATIONS

This application is a national phase application of International Application No. PCT/CN2014/081613, filed Mar. 7, 2014, which claims the benefit of priority to Chinese Patent Application No. CN 201410070502.1, filed Feb. 28, 2014, the content of each of which is incorporated herein by reference.

TECHNICAL FIELD

The present invention relates to a motor, a gimbal having the motor and an image capturing device having the gimbal.

BACKGROUND OF THE INVENTION

An image capturing device generally comprises a gimbal and an image capturing apparatus carried on the gimbal. The gimbal is configured to fix the image capturing device, freely adjust an attitude of the image capturing apparatus (e.g., changing an elevation and/or orientation of the image capturing apparatus) and stably maintain the image capturing apparatus at a determined attitude to achieve a stable, smooth and multi-angle image capturing. The image capturing apparatus may be a camcorder or a camera.

The gimbal comprises a motor. The motor is provided with a stator, a rotor and a sensor for sensing relative positions of the rotor with respect to the stator of the motor. The prior art sensor generally includes an encoder and a potentiometer, where the encoder has a high precision but a large volume, a high cost and a certain frictional resistance, and the potentiometer has a low precision but a greater frictional resistance, which significantly affects the controlling of the gimbal. Both sensors are contact type sensors, resulting in a great frictional resistance and poor electrical contact.

SUMMARY OF THE INVENTION

An object of the invention is to provide a motor having a low frictional resistance, a gimbal having the motor, and an image capturing device having the gimbal.

The aforementioned object may be achieved by various embodiments of the invention.

In some embodiments, a motor may comprise a stator, a rotator rotatably connected with the stator, and an electrical connecting device for providing an electric signal for the motor. The motor may further comprise a magnet fixed on the rotator, and a Hall angular displacement sensor fixed on the electrical connecting devices and arranged opposite to the magnet. The magnet and the Hall angular displacement sensor may be spaced from each other by the electrical connecting devices.

In some embodiments, a gimbal may comprise a first rotating member, a second rotating member rotatably connected with the first rotating member, and a motor configured to drive the second rotating member to rotate with respect to the first rotating member. The motor may comprise a stator, a rotator rotatably connected with the stator, and an electrical connecting device for providing an electric signal to the motor. The motor further comprises a magnet fixed on the rotator, and a Hall angular displacement sensor fixed on the electrical connecting device and arranged opposite to the magnet. The magnet and the Hall angular displacement sensor may be spaced from each other by the electrical connecting device.

In some embodiments, an image capturing device may comprise a gimbal and a payload carried on the gimbal. The gimbal may comprise a first rotating member, a second rotating member rotatably connected with the first rotating member, and a motor configured to drive the second rotating member to rotate with respect to the first rotating member. The motor may comprise a stator, a rotator rotatably connected with the stator, and an electrical connecting device configured to provide an electric signal to the motor. The motor may further comprise a magnet fixed on the rotator, and a Hall angular displacement sensor fixed on the electrical connecting device and arranged opposite to the magnet. The magnet and the Hall angular displacement sensor may be spaced from each other by the device.

As compared with the prior art, a method of detecting a positional relationship between the stator and the rotator by a non-contact Hall angular displacement sensor is provided in the present invention, which solves the great frictional resistance problem in conventional detection methods.

DETAILED DESCRIPTION OF THE INVENTION

The image capturing device in embodiments of the present invention may be used as an auxiliary device for photographing, image capturing, monitoring and sampling, and can be carried on an air-based vehicle (e.g., a rotor wing aircraft or a fixed wing aircraft), a water-based vehicle (e.g., a submarine or a ship), a road-based vehicle (e.g., an automobile) or a space-based vehicle (e.g., a satellite, a space station, or a spaceship) and the like. The image capturing device may comprise a gimbal and a payload carried on the gimbal. The gimbal may be configured to fix the payload, freely adjust an attitude of the payload (e.g., to change an elevation, an inclination angle and/or an orientation of the payload), and stably maintain the carried payload at a determined attitude. The payload may be an image capturing device such as a camera or a camcorder. Alternatively, the payload may also be a sensor or the like. In this embodiment, the image capturing device may be carried by an aircraft. The payload may be an interchangeable lens digital camera (ILDC), a surveillance camera or the like. The image capturing device according to the present invention will be described below in detail with reference to the accompanying drawings.

Figure 1:
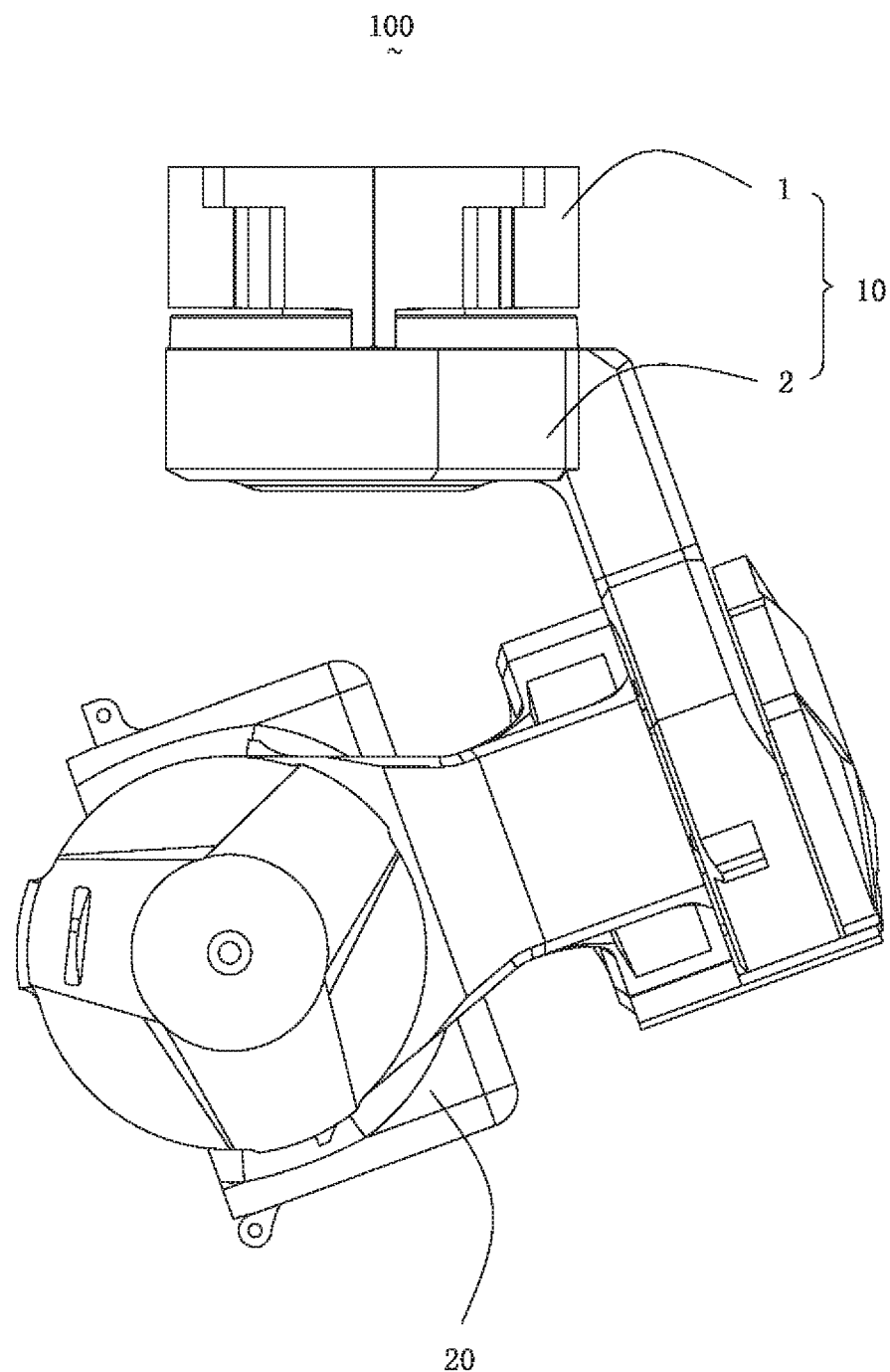
FIG. 1 is a perspective view of an image capturing device according to the invention.
Figure 2:
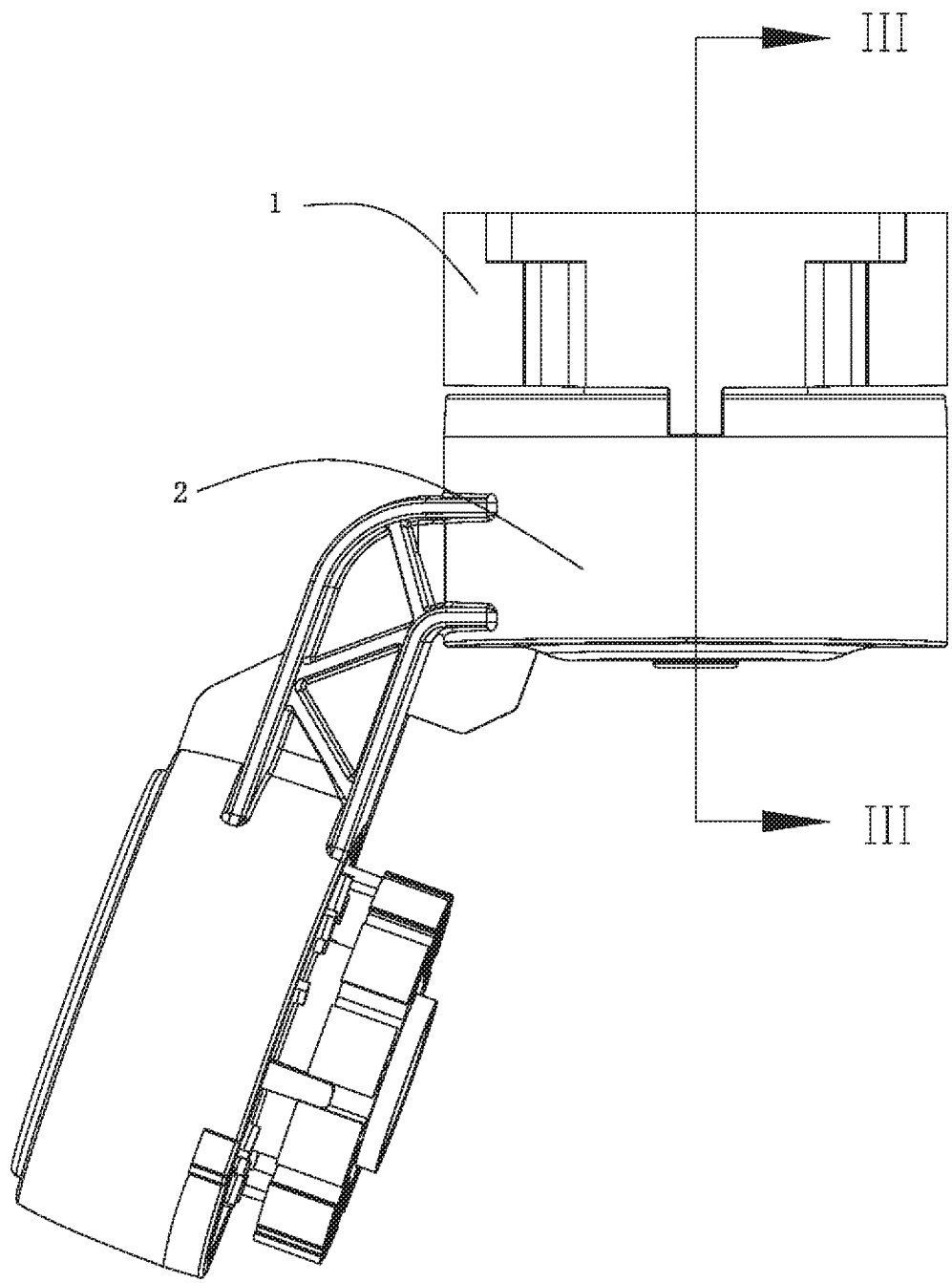
FIG. 2 is a perspective view of the image capturing device from which the carried payload is removed according to the invention.
Figure 3:
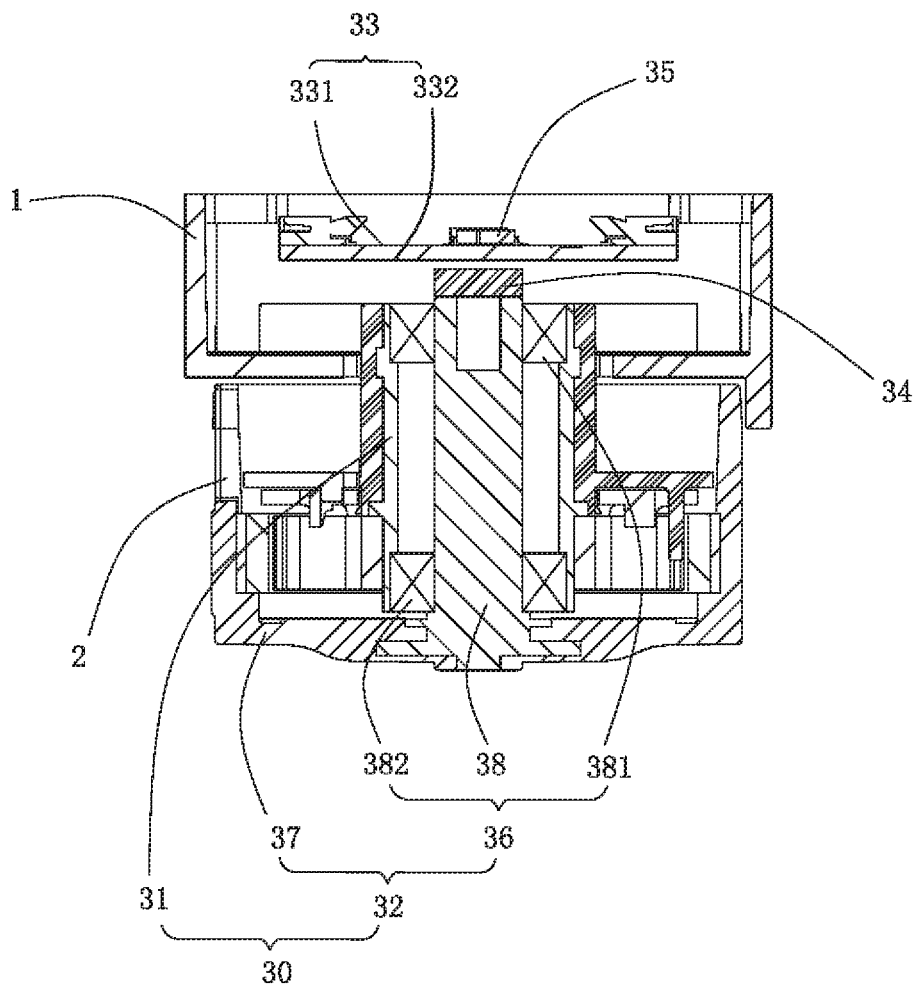
FIG. 3 is a sectional view of FIG. 2 along the line.
Figure 4:
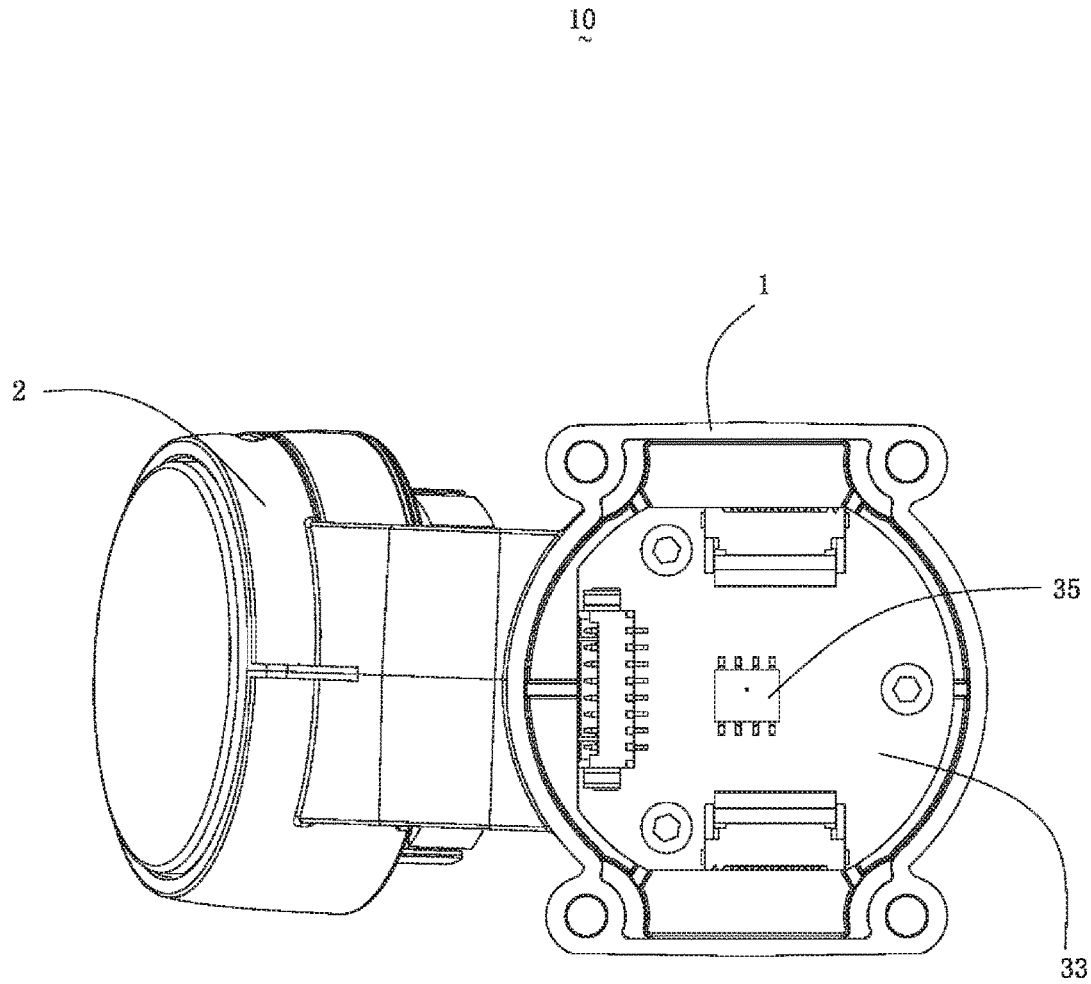
FIG. 4 is a perspective view of FIG. 2 from another angle of view, from which the first rotating member is partially omitted.

As illustrated in FIG. 1 to FIG. 4, in some embodiments of the invention, an image capturing device 100 may comprise a gimbal 10 and a payload 20 carried on the gimbal 10. The gimbal 10 comprises a first rotating member 1, a second rotating member 2 rotatably connected with one end of the first rotating member 1 and being configured to carry the payload 20, and a motor 30 connecting the first rotating member 1 with the second rotating member 2. In this embodiment, the payload 20 is a camera. The motor 30 is configured to drive the second rotating member 2 to rotate with respect to the first rotating member 1.

The motor 30 comprises a stator 31 fixed on the first rotating member 1, a rotator 32 rotatably connected with the stator 31 and fixed on the second rotating member 2, an electrical connecting device 33 fixed on the first rotating member 1 and providing an electric signal to the stator 31, a magnet 34 fixed on the rotator 32 and a Hall angular displacement sensor 35 fixed on the electrical connecting device 33 and arranged opposite to the magnet 34. The magnet 34 and the Hall angular displacement sensor 35 may operate together to detect relative positions of the rotator 32 with respect to the stator 31 of the motor 30. The magnet 34 and the Hall angular displacement sensor 35 are spaced from each other by the electrical connecting device 33.

The rotator 32 comprises a rotating shaft assembly 36 rotatably connected with the stator 31 and a rotor 37 fixed on the rotating shaft assembly 36. The rotor 37 is received in the second rotating member 2. In this embodiment, the stator 31 is a coil, and the rotor 37 is a magnet that generates a magnetic force with the stator 31. In an alternative embodiment, the stator 31 may be a magnet, and the rotor 37 may be a coil.

The rotating shaft assembly 36 comprises a rotating shaft 38, and an upper bearing 381 and a lower bearing 382 sleeved respectively on two ends of the rotating shaft 38. One end of the rotating shaft 38 is received in the first rotating member 1, and the other end is received in the second rotating member 2. The upper bearing 381 is received in the first rotating member 1. The lower bearing 382 is received in the second rotating member 2. The rotating shaft assembly 36 rotatably connects the first rotating member 1 with the second rotating member 2 through the rotor 37 and the stator 31. The magnet 34 is fixed on the rotating shaft 38 and arranged to face the electrical connecting device 33 which is received in the first rotating member 1.

The electrical connecting device 33 may be a printed circuit board (PCB) or a flexible circuit board. The electrical connecting device 33 comprises a first surface 331 and a second surface 332 opposite to the first surface 331. The Hall angular displacement sensor 35 may be fixed on the first surface 331, and the magnet 34 is arranged opposite to the second surface 332, such that the magnet 34 does not come into contact with the Hall angular displacement sensor 35. When the Hall angular displacement sensor 35 senses a positional relationship between the stator 31 and the rotator 32, the Hall angular displacement sensor 35 has a small volume; therefore the problem of great frictional resistance of conventional detection modes can be solved.

In some embodiments, in the image capturing device 100, the magnet 34 is fixedly connected with the rotator 32, and the electric connecting devices 33 provided with the Hall angular displacement sensor 35 is fixedly connected with the stator 31. The Hall angular displacement sensor 35 detects a rotational angle of the rotor 37 with respect to the stator 31, forming an angular displacement sensing manner which is of a non-contact type but has an effect equivalent to that of an absolute position encoder. The working resistance of the gimbal 10 is effectively reduced, and the response of the gimbal 10 is increased.

Furthermore, the stator 31 may be fixed directly on the first rotating member 1, and the rotator 32 may be fixed directly on the second rotating member 2, such that the stator 31 and the rotator 32 may be embedded directly into internal space of the first rotating member 1 and the second rotating member 2 and integrated with the first rotating member 1 and the second rotating member 2, effectively reducing an overall size of the gimbal 10.

The foregoing disclosure is merely illustrative of preferred embodiments of the invention, and the protection scope of the invention is not limited thereto. Any equivalent modifications or variations made by those of ordinary skill in the art according to the disclosure of the invention shall fall into the protection scope as defined in the appended claims.

What is claimed is:

1. A gimbal comprising:
   a first rotating member;
   a second rotating member rotatably connected with the first rotating member; and
   a motor configured to drive the second rotating member to rotate with respect to the first rotating member, wherein the motor comprises:
   a stator fixed directly to the first rotating member;
   a rotator rotatably connected with the stator and fixed directly on the second rotating member, wherein the rotator comprises:
      a rotating shaft assembly rotatably connected with the stator, the rotating shaft assembly comprising a rotating shaft, an upper bearing sleeved on an upper end of the rotating shaft, and a lower bearing sleeved on a lower end of the rotating shaft; and
      a rotor directly fixed to a first end of the rotating shaft;
   an electrical connecting device configured to provide an electric signal to the motor;
   a magnet directly affixed to a second end of the rotating shaft, the first end and the second end being two opposite ends of the rotating shaft; and
   a Hall angular displacement sensor fixed on a side of the electrical connecting device that faces away from the magnet, with no Hall displacement sensor placed on another side of the electrical connecting device that faces the magnet;
   wherein the stator is located between the magnet and the rotor in a length direction of the rotating shaft.

2. The gimbal of claim 1, wherein the rotor surrounds at least a portion of the stator.

3. The gimbal of claim 1, wherein:
   the electrical connecting device comprises a first surface and a second surface opposite to the first surface;
   the Hall angular displacement sensor is fixedly arranged on the first surface;
   the magnet is arranged opposite to the second surface; and
   the magnet is out of contact with the Hall angular displacement sensor.

4. The gimbal of claim 1, wherein the electrical connecting device is a PCB board or a flexible circuit board.

5. An image capturing device comprising:
   a payload; and
   a gimbal configured to carry the payload, the gimbal comprising:
   a first rotating member;
   a second rotating member rotatably connected with the first rotating member; and
   a motor configured to drive the second rotating member to rotate with respect to the first rotating member, wherein the motor comprises:
   a stator fixed directly to the first rotating member;

a rotator rotatably connected with the stator and fixed directly on the second rotating member, wherein the rotator comprises:
   a rotating shaft assembly rotatably connected with the stator, the rotating shaft assembly comprising a rotating shaft, an upper bearing sleeved on an upper end of the rotating shaft, and a lower bearing sleeved on a lower end of the rotating shaft; and
   a rotor directly fixed to a first end of the rotating shaft;
an electrical connecting device configured to provide an electric signal to the motor;
a magnet directly affixed to a second end of the rotating shaft, the first end and the second end being two opposite ends of the rotating shaft; and
a Hall angular displacement sensor fixed on a side of the electrical connecting device that faces away from the magnet, with no Hall displacement sensor placed on another side of the electrical connecting device that faces the magnet;

wherein the stator is located between the magnet and the rotor in a length direction of the rotating shaft.

6. The image capturing device of claim 5, wherein the payload is connected with the second rotating member.

7. The image capturing device of claim 5, wherein the payload is a camera.

8. The image capturing device of claim 5, wherein the rotor surrounds at least a portion of the stator.

9. The image capturing device of claim 5, wherein:
   the electrical connecting device comprises a first surface and a second surface opposite to the first surface;
   the Hall angular displacement sensor is fixedly arranged on the first surface;
   the magnet is arranged opposite to the second surface; and
   the magnet is out of contact with the Hall angular displacement sensor.

10. The image capturing device of claim 5, wherein the electrical connecting device is a PCB board or a flexible circuit board.

* * * * *